United States Patent Office 3,449,564
Patented June 10, 1969

3,449,564
MASS SPECTROMETER LEAK DETECTOR CIRCUIT MEANS EMPLOYING AN INSULATED GATE FIELD EFFECT TRANSISTOR
Philip C. Harvey, Bedford, Deane P. Sheldon, Franklin, and Leendert J. K. van Opijnen, Needham, Mass., assignors to National Research Corporation, Newton, Mass., a corporation of Massachusetts
Filed Dec. 9, 1966, Ser. No. 600,622
Int. Cl. B01d 59/44
U.S. Cl. 250—41.9      2 Claims

ABSTRACT OF THE DISCLOSURE

A mass spectrometer leak detector with an insulated gate field effect transistor incorporated in the spectrometer tube, as a pre-amplifier in the spectrometer collector circuit, is described.

---

The present invention relates to the operation of mass spectrometers which have collector currents varying over several orders of magnitude and which currents are very small—on the order of $10^{-15}$ amperes. These are used, inter alia, as leak detectors for checking hermetically sealed equipment (see e.g. U.S. Patent 2,486,199 to Nier). Feedback amplifiers for such instruments are described in 10 Review of Scientific Instruments 181–183 September 1939) and in U.S. Patent 2,462,190 to Hipple.

It is the object of the present invention to provide an improvement in such apparatus characterized by low noise, low power requirement and longer operating life than conventional apparatus. These criteria are typical of transistor circuits generally, but heretofore it has not been possible to replace the conventional tube amplifiers used in this application.

The present invention provides a structural arrangement which makes it feasible to replace the tube amplifier in accord with the foregoing object. We have a modified conventional mass spectrometer leak detector and converted its tube amplifier to a solid state amplifier and have operated it with essentially none of the loss of helium detection sensitivity which would normally be expected in such a substitution.

Figure 1:
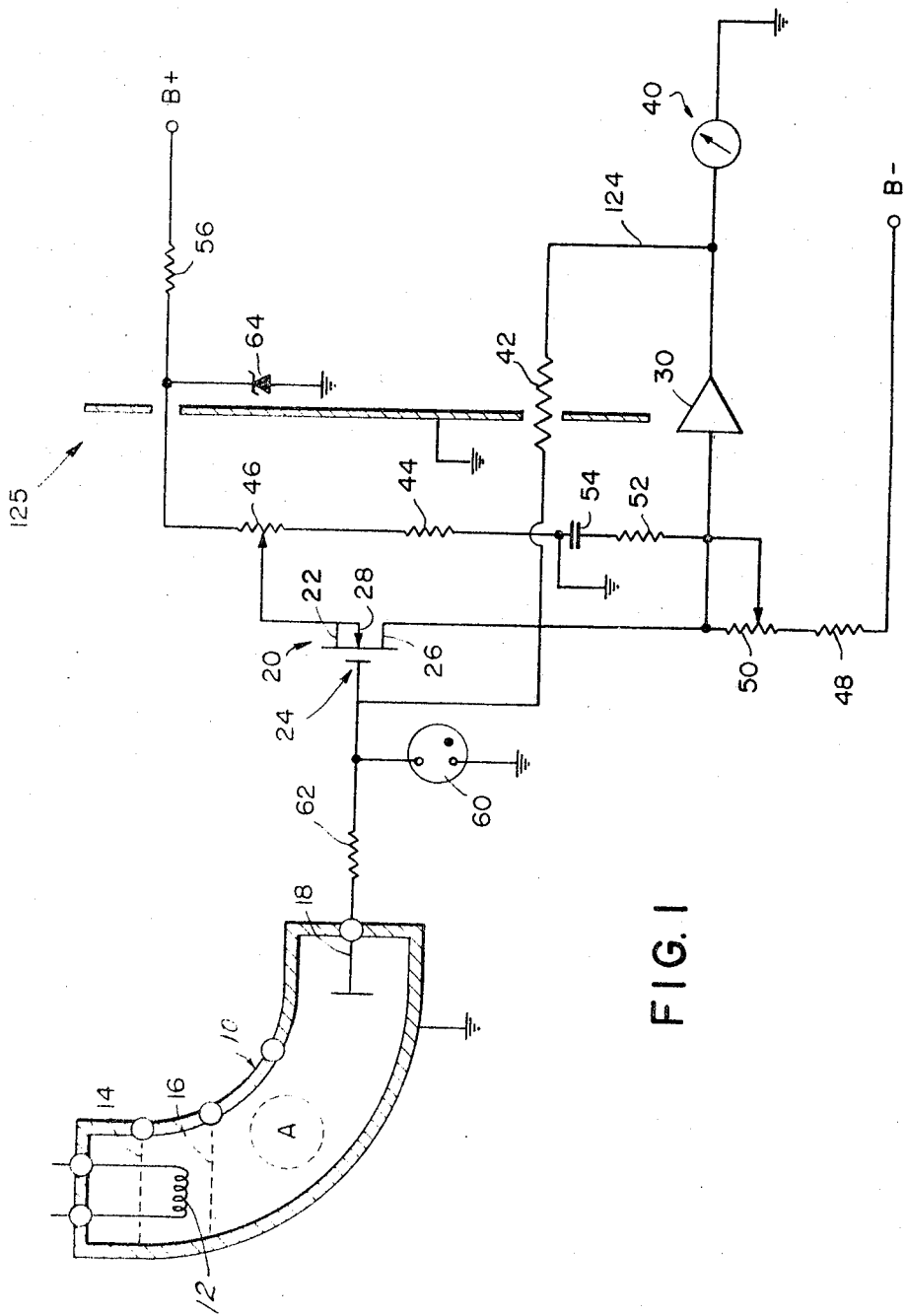
Figure 2:
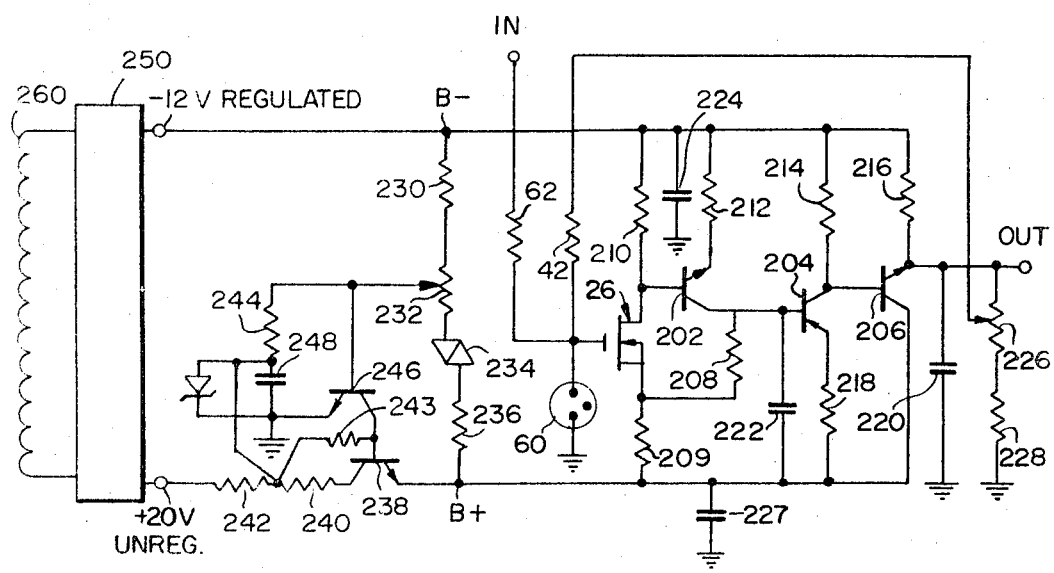
Figure 1A:
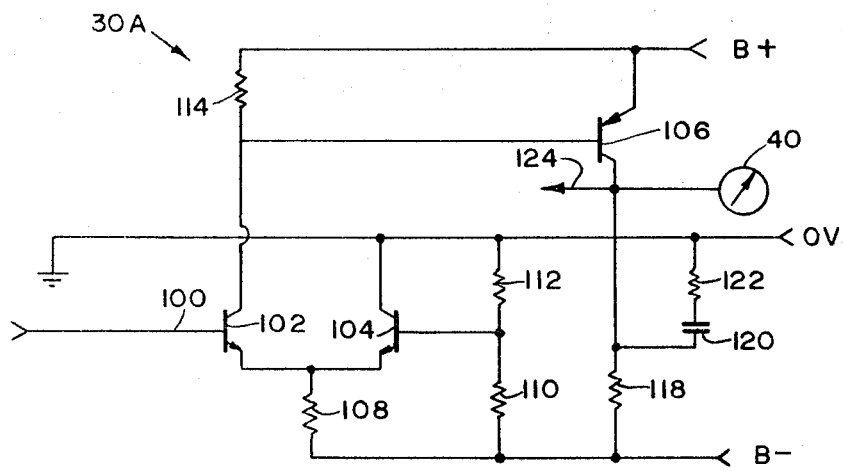

The invention is now described in greater detail with reference to the accompanying drawings in which FIG. 1 is a circuit diagram of a first embodiment of the invention, FIG. 1A is a circuit diagram of a portion of the amplifier used in the FIG. 1 embodiment and FIG. 2 is a circuit diagram of a second embodiment of the invention.

In FIG. 1, a mass spectrometer leak detector tube is indicated at 10. Such apparatus comprises an electron emitting filament 12, an ion repeller 14, an ion grid 16, a magnetic analyzing field A and a collector 18. The ion current output of the collector is fed to a preamplifier transistor 20. The preamplifier consists of an insulated gate semiconductor field-effect-transistor (IGFET) with gate 24, source 22, drain 26 and bulk 28 electrodes. The output of the preamplifier 20 is fed to a further amplification means 30 which may be a single 2N3395 transistor or the last three tubes of the tube amplifier shown in Hipple patent, supra, but which should be arranged for proper IGFET bias, as described below, and is preferably the solid state three-transistor amplifier described below in connection with FIG. 1A. Continuing through FIG. 1, the output of amplifier 30 is fed to an electrometer 40 (or other output device such as a relay). A selected portion of the amplifier output is fed through a feedback resistor 42 back to the IGFET gate electrode 24. Source bias is obtained from zero setting resistances 44 and 46. Adjustment is provided through resistors 48 and 50 to adjust the IGFET drain current for zero temperature coefficient of gate voltage. Oscillation is prevented by capacitor 54 and resistor 52. Voltage surges to the gate electrode are held to about 60 volts by glow discharge tube 60 which is, in turn, current limited by resistor 62. Voltage regulation of the power supply is provided by Zener diode 64.

The IGFET 20 and feedback resistor 42 are both mounted in vacuum with the collector 18. Since these high impedance elements must carry currents on the order of $10^{-15}$ amperes, such location is necessary to minimize the effect of leakage currents. The IGFET is entirely vacuum compatible and registers little or no selective surface effect on the partial pressure of the gas being measured in tube 10, e.g. helium.

Referring now to FIG. 1A, there is shown an amplifier 30A for use in FIG. 1. The input connection of the amplifier is shown at 100 and the output connection at 124. Line 124 leads back to the IGFET gate through the feedback resistor. The amplifier comprises three transistor stages 102, 104, 106 with conventional biasing resistors 108, 110, 112, 114, 118 and phasing elements 120, 122. A metal plate 125 (FIG. 1) is mounted in the amplifier to limit capacitive coupling between the electrometer output and input, to improve transient response. Resistors 110 and 112 are chosen so that the IGFET drain voltage is equal to the IGFET source voltage, to cancel leakage to the IFGET gate across the IGFET header, and to minimize transient polarization of the IGFET insulating barrier.

Referring now to FIG. 2, there is shown a second embodiment of the invention. Parts similar to those of FIG. 1 are generally indicated by similar reference numerals. The IGFET 20 has its drain electrode 26 connected to a transistor amplifier stage 202 which is in turn connected to further stages 204, 206. A negative feedback path is provided around IGFET 20 via transistor 202 and resistors 208 and 209. The necessary bias is provided by resistors 209, 210, 212, 214, 216, 218. Noise filtering is provided through capacitors 220, 222, 224, 227. Feedback ratio is controlled by variable resistor 226 and resistor 228.

In this embodiment, temperature compensation is performed by a varistor 234 incorporated in the power supply. The power supply comprises a transformer secondary 260 and a bridge rectifier-filter 250 providing an unregulated +20, and regulated −12, volt output. Regulation is provided through the circuit elements 230–244 described below. Zero adjust is provided by potentiometer 232 in the power supply working via a transistor 246 and a properly selected resistor 244 to provide a temperature regulated B+ voltage between 5 to 8 volts, but equal in magnitude to the minus source voltage. The resistor 244, a unique feature in power supplies of this type, also provides compensation for input voltage variations which can run as high as 15%.

Typical circuit elements in the FIG. 1–1A and FIG. 2 embodiments are:

FIG. 1–1A

| | |
|---|---|
| Tube 10 | NRC 925 or GEM-60. |
| IGFET | FI100. |
| Diode 64 | IN938. |
| Transistor 102 | 2N3395. |
| Transistor 104 | 2N3395. |
| Transistor 106 | 2N3638. |
| Resistor 62 | 100K. |
| Resistor 42 | $6 \times 10^{11}$ ohms. |
| Resistor 44 | 4.7K. |
| Resistor 46 | 5K. |
| Resistor 48 | 22K. |
| Resistor 50 | 20K. |
| Resistor 52 | 1K. |
| Resistor 56 | 470. |
| Capacitor 54 | 0.1 mf. |
| Capacitor 120 | .005 mf. |
| Resistor 108 | 10K. |
| Resistor 110 | 1K. |
| Resistor 112 | 1K. |
| Resistor 114 | 3.3K. |
| Resistor 118 | 3.3K. |
| Resistor 122 | 3.3K. |

FIG. 2

| | |
|---|---|
| Transistor 202 | 2N3395. |
| Transistor 204 | 2N3638. |
| Transistor 206 | 2N3395 |
| Resistor 208 | 10K. |
| Resistor 209 | 330. |
| Resistor 210 | 2.4K. |
| Resistor 212 | 330. |
| Resistor 214 | 10K. |
| Resistor 216 | 1K. |
| Resistor 218 | 1K. |
| Resistor 226 | Zero to 25K. |
| Resistor 228 | 6.2K. |
| Capacitor 220 | .1 mf. |
| Capacitor 222 | .1 mf. |
| Capacitor 224 | 10 mf. |
| Capacitor 225 | .1 mf. |
| Capacitor 227 | .1 mf. |

POWER SUPPLY

| | |
|---|---|
| Resistor 230 | 6.8K. |
| Resistor 232 | Zero to 1K. |
| Resistor 236 | 3K. |
| Resistor 240 | 100. |
| Resistor 242 | 220. |
| Resistor 243 | 10K. |
| Resistor 244 | 390K. |
| Varistor 234 | 1½–2½ millivolt compensation per degree C. |
| Transistor 246 | 2N3395. |
| Transistor 238 | 2N3053. |
| Capacitor 248 | 100 mf. |

What is claimed is:
1. In a partial pressure responsive mass spectrometer leak detector for detecting ion currents on the order of $10^{-15}$ amperes,
  (a) means defining an hermetically sealed vacuum chamber;
  (b) gas ionization, ion extraction and ion collector electrodes mounted in said chamber;
  (c) an insulated gate semiconductor field effect transistor pre-amplifier, with gate, source, bulk, and drain electrodes, mounted in said chamber with the gate electrode electrically connected to said ion collector electrode;
  (d) voltage limiting means connected to said gate electrode;
  (e) means providing a suitable positive bias to said source electrode and a suitable negative bias to said drain electrode;
  (f) means for adjusting the drain to source current to compensate for ambient temperature caused variations therein;
  (g) voltage amplifier means connected across said drain and source electrodes;
  (h) a negative feedback loop, with a high impedance element therein, electrically connected from the amplifier output to the preamplifier gate electrode, the said high impedance element being mounted in the vacuum chamber, the high impedance element having a D.C. series resistance on the order of $10^{11}$ ohms to provide a voltage gain on the order of unity; and
  (i) an output load, electrically connected to said amplifier output.

2. The apparatus of claim 1 wherein said means (e) provides source and drain voltages of essentially equal magnitude to cancel leakage to the pre-amplifier gate and minimize transient polarization of the pre-amplifier insulating barrier.

References Cited

UNITED STATES PATENTS

| 2,462,190 | 2/1949 | Hipple | 330—92 |
| 3,155,826 | 11/1964 | Peters. | |
| 3,388,338 | 6/1968 | Austin | 330—29 |

RALPH G. NILSON, *Primary Examiner.*

A. L. BIRCH, *Assistant Examiner.*

U.S. Cl. X.R.

250—83.3; 307—304; 330—29, 35